(12) United States Patent
Hsia

(10) Patent No.: US 9,668,308 B2
(45) Date of Patent: May 30, 2017

(54) LINEAR SOLID-STATE LIGHTING COMPATIBLE WITH BALLASTS IN DOUBLE ENDS AND OPERABLE WITH AC MAINS IN A SINGLE END

(71) Applicant: Lightel Technologies, Inc., Renton, WA (US)

(72) Inventor: Chungho Hsia, Bellevue, WA (US)

(73) Assignee: LIGHTEL TECHNOLOGIES, INC., Renton, WA (US)

( * ) Notice: Subject to any disclaimer, the term of this patent is extended or adjusted under 35 U.S.C. 154(b) by 0 days.

(21) Appl. No.: 15/199,365

(22) Filed: Jun. 30, 2016

(65) Prior Publication Data

US 2016/0316533 A1    Oct. 27, 2016

Related U.S. Application Data

(63) Continuation-in-part of application No. 15/050,363, filed on Feb. 22, 2016, now Pat. No. 9,544,959, which
(Continued)

(51) Int. Cl.
*H05B 33/08* (2006.01)
*F21V 19/00* (2006.01)
(Continued)

(52) U.S. Cl.
CPC .......... *H05B 33/0815* (2013.01); *F21K 9/27* (2016.08); *F21V 25/04* (2013.01); *H02M 1/32* (2013.01); *H05B 33/0803* (2013.01); *H05B 33/0806* (2013.01); *H05B 33/0845* (2013.01); *H05B 33/0884* (2013.01); *F21Y 23/06* (2013.01); *F21Y 2105/10* (2016.08); *F21Y 2115/10* (2016.08);
(Continued)

(58) Field of Classification Search
None
See application file for complete search history.

(56) References Cited

U.S. PATENT DOCUMENTS

2014/0225519 A1* 8/2014 Yu .................. H05B 33/0809
                                                                315/187
2016/0081147 A1* 3/2016 Guang .............. H05B 33/0803
                                                                315/123
(Continued)

*Primary Examiner* — Douglas W Owens
*Assistant Examiner* — James H Cho
(74) *Attorney, Agent, or Firm* — Han IP Corporation; Andy M. Han

(57) ABSTRACT

A linear light-emitting diode (LED) tube lamp using a six-diode combination and a ballast compatible and AC mains operable (BA) LED driving circuit operate normally with AC mains in a single end and with an electronic ballast in double ends. The BA LED driving circuit configured to operate in a wide range of input voltages and frequencies, especially for various high voltages and high frequencies associated with various electronic ballasts to provide a regulated power and a current from either electronic ballast or AC mains. With a cycle-by-cycle current control and power switching at a constant on-time and varied off-time, an over-rated surge current is limited, preventing occasional fire hazards occurred in the ballast. An additional frequency sensitive device is used to prevent a possible electric shock from occurring for both configurations during initial installation and re-lamping, thus no shock protection switches needed.

13 Claims, 6 Drawing Sheets

Related U.S. Application Data is a continuation-in-part of application No. 14/688,841, filed on Apr. 16, 2015, now Pat. No. 9,288,867, which is a continuation-in-part of application No. 14/465,174, filed on Aug. 21, 2014, now Pat. No. 9,277,603, which is a continuation-in-part of application No. 14/135,116, filed on Dec. 19, 2013, now Pat. No. 9,163,818, which is a continuation-in-part of application No. 13/535,249, filed on Jun. 27, 2012, now abandoned.

(51) Int. Cl.
| | | |
|---|---|---|
| *F21V 25/04* | (2006.01) | |
| *H02M 1/32* | (2007.01) | |
| *F21K 9/27* | (2016.01) | |
| *F21Y 115/10* | (2016.01) | |
| *F21V 23/06* | (2006.01) | |
| *H02M 1/00* | (2006.01) | |
| *F21Y 105/10* | (2016.01) | |

(52) U.S. Cl.
CPC .... *H02M 2001/0058* (2013.01); *Y02B 20/341* (2013.01); *Y02B 20/347* (2013.01); *Y02B 70/1491* (2013.01)

(56) References Cited

U.S. PATENT DOCUMENTS

| | | | | |
|---|---|---|---|---|
| 2016/0113076 A1* | 4/2016 | Davenport | ......... | H05B 33/0815 |
| | | | | 315/201 |
| 2016/0174329 A1* | 6/2016 | Su | ................ | H05B 33/0887 |
| | | | | 315/125 |

\* cited by examiner

LINEAR SOLID-STATE LIGHTING COMPATIBLE WITH BALLASTS IN DOUBLE ENDS AND OPERABLE WITH AC MAINS IN A SINGLE END

CROSS-REFERENCE TO RELATED APPLICATIONS

The present disclosure is a continuation-in-part (CIP) application of U.S. patent application Ser. No. 15/050,363, filed 22 Feb. 2016, which is a CIP application of U.S. patent application Ser. No. 14/688,841, filed 16 Apr. 2015 and issued as U.S. Pat. No. 9,288,867 on 15 Mar. 2016, which is a CIP application of U.S. patent application Ser. No. 14/465,174, filed 21 Aug. 2014 and issued as U.S. Pat. No. 9,277,603 on 1 Mar. 2016, which is a CIP application of U.S. patent application Ser. No. 14/135,116, filed 19 Dec. 2013 and issued as U.S. Pat. No. 9,163,818 on 20 Oct. 2015, which is a CIP application of U.S. patent application Ser. No. 13/525,249, filed 15 Jun. 2012 and issued as U.S. Pat. No. 8,749,167 on 10 Jun. 2014. The above-identified applications are incorporated herein by reference in their entirety.

BACKGROUND

Technical Field

The present disclosure relates to linear light-emitting diode (LED) lamps that work with conventional fluorescent lamp fixtures configured to electrically connect either ballasts in double ends or AC mains in a single end.

Description of the Related Art

Solid-state lighting from semiconductor light-emitting diodes (LEDs) has received much attention in general lighting applications today. Because of its potential for more energy savings, better environmental protection (with no hazardous materials used), higher efficiency, smaller size, and longer lifetime than conventional incandescent bulbs and fluorescent tubes, the LED-based solid-state lighting will be a mainstream for general lighting in the near future. Meanwhile, as LED technologies develop with the drive for energy efficiency and clean technologies worldwide, more families and organizations will adopt LED lighting for their illumination applications. In this trend, the potential safety concerns such as risk of electric shock and fire become especially important and need to be well addressed.

In today's retrofit applications of a linear LED tube lamp (LED tube lamp, hereafter in Background section)) to replace an existing fluorescent lamp, consumers may choose either to adopt a ballast-compatible LED tube lamp with an existing ballast used to operate the fluorescent lamp or to employ an AC mains-operable LED tube lamp by removing/bypassing the ballast. Either application has its advantages and disadvantages. In the former case, although the ballast consumes extra power, it is straightforward to replace the fluorescent lamp without rewiring, which consumers have a first impression that it is the best alternative. But the fact is that total cost of ownership for this approach is high regardless of very low initial cost. For example, the ballast-compatible LED tube lamps work only with particular types of ballasts. If the existing ballast is not compatible with the ballast-compatible LED tube lamp, the consumer will have to replace the ballast. Some facilities built long time ago incorporate different types of fixtures, which requires extensive labor for both identifying ballasts and replacing incompatible ones. Moreover, a ballast-compatible LED tube lamp can operate longer than the ballast. When an old ballast fails, a new ballast will be needed to replace in order to keep the ballast-compatible LED tube lamps working. Maintenance will be complicated, sometimes for the lamps and sometimes for the ballasts. The incurred cost will preponderate over the initial cost savings by changeover to the ballast-compatible LED tube lamps for hundreds of fixtures throughout a facility. In addition, replacing a failed ballast requires a certified electrician. The labor costs and long-term maintenance costs will be unacceptable to end users. From energy saving point of view, a ballast constantly draws power, even when the ballast-compatible LED tube lamps are dead or not installed. In this sense, any energy saved while using the ballast-compatible LED tube lamps becomes meaningless with the constant energy use by the ballast. In the long run, the ballast-compatible LED tube lamps are more expensive and less efficient than self-sustaining AC mains-operable LED tube lamps.

On the contrary, an AC mains-operable LED tube lamp does not require a ballast to operate. Before use of the AC mains-operable LED tube lamp, the ballast in a fixture must be removed or bypassed. Removing or bypassing the ballast does not require an electrician and can be replaced by end users. Each AC mains-operable LED tube lamp is self-sustaining. Once installed, the AC mains-operable LED tube lamps will only need to be replaced after 50,000 hours. In view of above advantages and disadvantages of both the ballast-compatible LED tube lamps and the AC mains-operable LED tube lamps, it seems that market needs a most cost-effective solution by using a universal LED tube lamp that can be used with the AC mains and is compatible with a ballast so that LED tube lamp users can save an initial cost by changeover to such an LED tube lamp followed by retrofitting the lamp fixture to be used with the AC mains when the ballast dies.

Ballasts have several different types. However in the US, electronic ballasts are most popular in lamp fixtures because they are more efficient and less expensive than other types of ballasts. Nevertheless, it is better for the ballast-compatible LED tube lamp to be compatible with either electronic ballasts or other types of ballasts.

As mentioned above, a cost-effective solution may be to use a ballast as part of an LED driver to operate a lamp. In some prior art schemes, a switching mode power supply (SMPS) type LED driver is proposed to use with a ballast, but has not been completely accepted due to occasional fires that arise inside the ballast. The cause of these fires has been identified to be a large dc input capacitor in the SMPS type LED driver, which may destroy a capacitor in the ballast due to excessive initial resonant voltage. A conventional SMPS type LED driver for AC mains comprises a Buck converter, which can efficiently convert input voltages of 110~277 VAC into a DC voltage required to power LEDs in an LED tube lamp. However, the ballast has an output voltage much higher than 277 VAC with a frequency well above 60 Hz. Such a Buck converter is controlled by a control logic, which has several drawbacks that limit its use in ballast applications. First, the control logic has a low operating voltage range which inherently limits the wide range of input voltages that can be used. Second, an over-voltage protection (OVP) function in the control logic starts at a low voltage limited by the low operating voltage. When an input voltage from a ballast exceeds a certain value, OVP functions to stop operation, shutting down the lamp. Third, the Buck converter operates in a continuous conduction mode, in which an input current fails to follow the input voltage, leading to a low power factor with the AC mains and turn-on or other operational failures with the ballast. Fourth, the control logic is solely powered by a voltage built up by an input capacitor with a small capacitance to meet a short start-up requirement. When the input voltage drops to the minimum operating voltage level, the control logic fails to operate and sends no signals to the switch, and the Buck converter stops to function until the input voltage level recovers, resulting in flickering. For an LED tube lamp operating solely with a ballast, the power and current control is basically via an impedance or output voltage control. In the former case, when input frequency changes, the impedance changes, altering an AC current to flow into the driving circuit. A ballast is, in practice, supposed to operate two or more lamps, and its output frequency of the ballast decreases as a load increases, meaning that the total power consumption does not linearly increase as the number of lamps used increases. In the worst case, an LED tube lamp that is designed for a group of three or four lamps in a fixture powered by a ballast may be burned out due to over-rated current flowing into the LED arrays in the lamp if only one of such a lamp is installed in the fixture. For the latter case, the output voltage control approach may work with an electronic ballast but cannot be used in AC mains. In general, conventional LED drivers fail to work with a ballast and to properly operate an LED tube lamp at a regulated power, resulting in unstable lighting output. It goes without saying that the same LED drivers can flawlessly operate the LED tube lamp with the AC mains.

Conventional fluorescent lamp fixtures receive a ballast output voltage from both ends, so called double-ended configuration. When such fixtures are retrofitted double-ended to operate LED tube lamps with the AC mains, a leakage current can flow out of the exposed bi-pin, resulting in an electric shock hazard to an installer. Thus Underwriters Laboratories (UL) require that double shock protection switches be used in the LED tube lamps wired in the double-ended configuration using the AC mains as a power source. However, if the AC mains supply from a single end, i.e. a bi-pin in one end (say, the first end) of the LED tube lamp, with the other end (the second end) electrically isolated from the first end, then the electric shock hazard can be eliminated. One question is: in addition to a single end for AC mains operation, when double ends are also needed for ballast operation, both the first end and the second end are electrically connected to the ballast. How can the LED tube lamps electrically connect to AC mains in a single end and to ballasts in double ends without electric shock hazards? In this patent disclosure, a novel approach will be well addressed.

SUMMARY

The present disclosure aims to provide a novel approach that can be adopted to operate a linear LED tube (LLT) lamp with AC mains in a single-ended manner and work with an electronic ballast configured in a double-ended manner. No electric shock is possible to occur for both configurations during initial installation and re-lamping. The LLT lamp may include a housing having two opposite ends; a light-emitting diode printed circuit board (LED PCB) comprising LED arrays and copper traces; two lamp bases respectively connected to the two opposite ends of the housing, each lamp base comprising a bi-pin each with two pins protruding outwards; at least one frequency sensitive device; at least six diodes served to manage electric current flows and to convert alternating current (AC) from AC mains and ballast to direct current (DC) voltage; and a ballast compatible and AC operable (BA) LED driving circuit. The LLT lamp is used to replace a fluorescent lamp in a retrofit or newly-made lamp fixture that could have an existing ballast operated in a double-ended manner or simply an AC mains-ready single-ended configuration. When such an LLT lamp is installed in the fixture, the at least six diodes can detect how an input AC voltage is applied, control electric current flows, and complete current returns to an applicable pin on the LLT lamp so that the LLT lamp can operate with the existing ballast in double ends or simply with the AC mains in a single end without operational uncertainty.

The BA LED driving circuit is essential to make such a dual-mode operation possible. The BA LED driving circuit may include an input filter, a power factor correction (PFC) and control device, a Buck converter in communicating with the PFC and control device, an output capacitor in parallel with a resistor connected to the Buck converter to build up an output voltage and to power the LED arrays, and a voltage feedback module extracting partial energy from the output voltage to sustain the PFC and control device. The Buck converter comprises a switch controlled by the PFC and control device, a current sensing resistor, a diode, and an inductor with its current charging and discharging controlled by the switch. The PFC and control device detects zero current in the inductor within an AC cycle of an input voltage generating control signals to control the switch on and off with a constant on-time and a varied off-time. By adapting switching frequencies for a high frequency associated with an electronic ballast and a low frequency associated with a magnetic ballast or the AC mains, the BA LED driving circuit can provide an accurate output LED current required to operate the LED arrays no matter what input voltage is a high voltage from the ballasts or regular 110 or 277 VAC from the AC mains. Not like prior art schemes that use an AC impedance control in the ballast compatible lamps, the BA LED driving circuit adopts a scheme using a switching mode power supply with regulated output power and current in the ballast compatible lamps. The same switching mode power supply used in the BA LED driving circuit to work with the ballasts can also apply to the LLT lamps in operating with the AC mains.

Furthermore, because the AC mains are from a single end while the ballast voltage is from double ends of the LLT lamp, a leakage current can considerably be blocked by using the frequency sensitive device, thus no electric shock hazard possibly occurred at the exposed bi-pin.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION OF VARIOUS EMBODIMENTS

Figure 1:
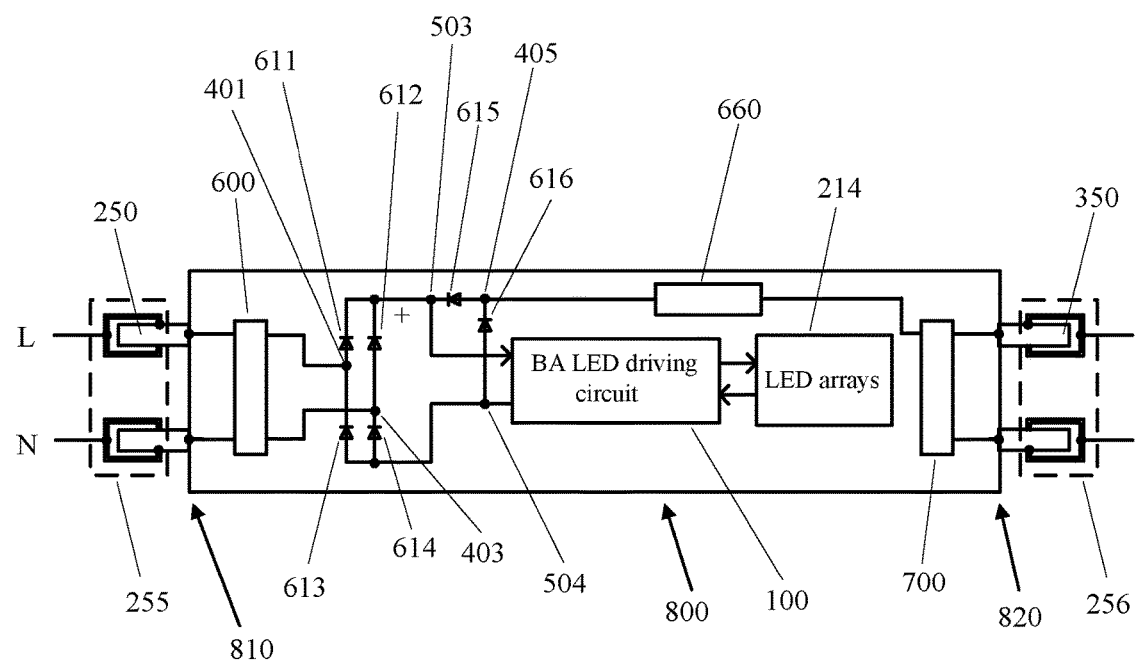
FIG. 1 is a block diagram of a linear LED tube lamp operable with AC mains in a single end according to the present disclosure.

FIG. 1 is a block diagram of a linear LED tube lamp operable with AC mains in a single end according to the present disclosure. The linear LED tube (LLT) lamp 800 comprises a housing having two opposite ends; two lamp bases 810 and 820 having respective bi-pins 250 and 350 at each end of the housing; a front-end module 600; a rear-end module 700; at least six diodes comprising four front-end diodes 611, 612, 613, and 614 and two rear-end diodes 615 and 616 with the four front-end diodes and two rear-end diodes interconnected at ports 503 and 504; at least one frequency sensitive device 660; a ballast compatible and AC operable (BA) LED driving circuit 100 having two inputs connected to the ports 503 and 504; and LED arrays 214 on an LED PCB. Each of the front-end module 600 and the rear-end module 700 comprises a filament circuit comprising a capacitor in parallel with a resistor. The two filament circuits in the front-end module 600 and the rear-end module 700 are respectively connected in parallel to the bi-pins 250 and 350. The front-end module 600 also connects to the four front-end diodes 611-614 at ports 401 and 403 whereas the at least one frequency sensitive device 660 connects to the two rear-end diodes 615 and 616 at a port 405. The four front-end diodes 611-614 and the two rear-end diodes 615 and 616 in combination thus can receive power either from the bi-pin 250 connected to a socket 255 for the AC mains (L and N) or from both the bi-pin 250 connected to the socket 255 and the bi-pin 350 connected to the other socket 256 for an electronic ballast in a double-ended wiring lamp fixture.

The two filament circuits in the front-end module 600 and the rear-end module 700 are configured across the bi-pins 250 and 350 to mimic a filament in a fluorescent lamp to operate with a rapid-start electronic ballast. However, not like the filament in the fluorescent lamp in which a low resistance such as 10 ohms is used, each filament circuit in the front-end module 600 and the rear-end module 700 must have a low impedance such as less than hundreds of ohms at a high frequency such as 45 kHz or higher when operated with the rapid-start electronic ballast and a high impedance such as several of kilo ohms at 50/60 Hz when operated with AC mains. The best choice is to make such high and low impedances in a way that an impedance ratio between the high impedance and the low impedance is higher than 13 at frequencies between 60 Hz and 45 kHz. Thus, the two filament circuits in the front-end module 600 and the rear-end module 700 can be used to selectively allow an alternating current (AC) current at the high frequency from the rapid-start electronic ballast to pass through but effectively block the AC current at the low frequency from the AC mains. Otherwise, when the AC mains are accidentally applied between respective two pins of the bi-pins 250 and 350, a large current passing through the filament circuits in the front-end modules 600 and the rear-end module 700 can burn them out immediately, thereby causing a fire hazard.

When the AC mains appear at the bi-pin 250, the dedicated bi-pin for AC mains in a single-ended application, an AC voltage applies to the ports 401 and 403 via the front-end module 600. The four front-end diodes 611-614 are configured as a bridge rectifier to convert the AC voltage into a direct current (DC) voltage with a high electric potential at the port 503 relative to a low electric potential at the port 504. After a DC current via either the diode 611 or the diode 612 starts at the port 503 to flow into the BA LED driving circuit 100, a proper output driving voltage is built up to power the LED arrays 214. An electric current returns at the port 504 and finds its way out via a forward-biased diode, either the diode 613 or the diode 614 to the AC mains, completing a power delivery to the LED arrays 214. When the electric current returns at the port 504, a leakage current may flow through the diode 616 in the two rear-end diodes 615 and 616 to the at least one frequency sensitive device 660. If the at least one frequency sensitive device 660 is not present, the leakage current may flow through the bi-pin 350, creating an electric shock hazard. The at least one frequency sensitive device 660 has the same characteristics as the filament circuits in the front-end modules 600 and the rear-end module 700, a high impedance such as several of kilo ohms at the low frequency of 50/60 Hz for the AC mains relative to a low impedance such as less than hundreds of ohms at the high frequency of 45 kHz and higher. This way, the leakage current at the low frequency of 50/60 Hz for the AC mains flowing through the diode 616 in the two rear-end diodes 615 and 616 can be considerably blocked by the at least one frequency sensitive device 660, eliminating the electric shock hazard. In other words, the at least one frequency sensitive device 660 is used to couple the AC voltage from the electronic ballast and decouple the AC voltage from the AC mains, making sure that the electric shock will never occur. In this sense, the at least one frequency sensitive device 660 may comprise a capacitor.

Figure 2:
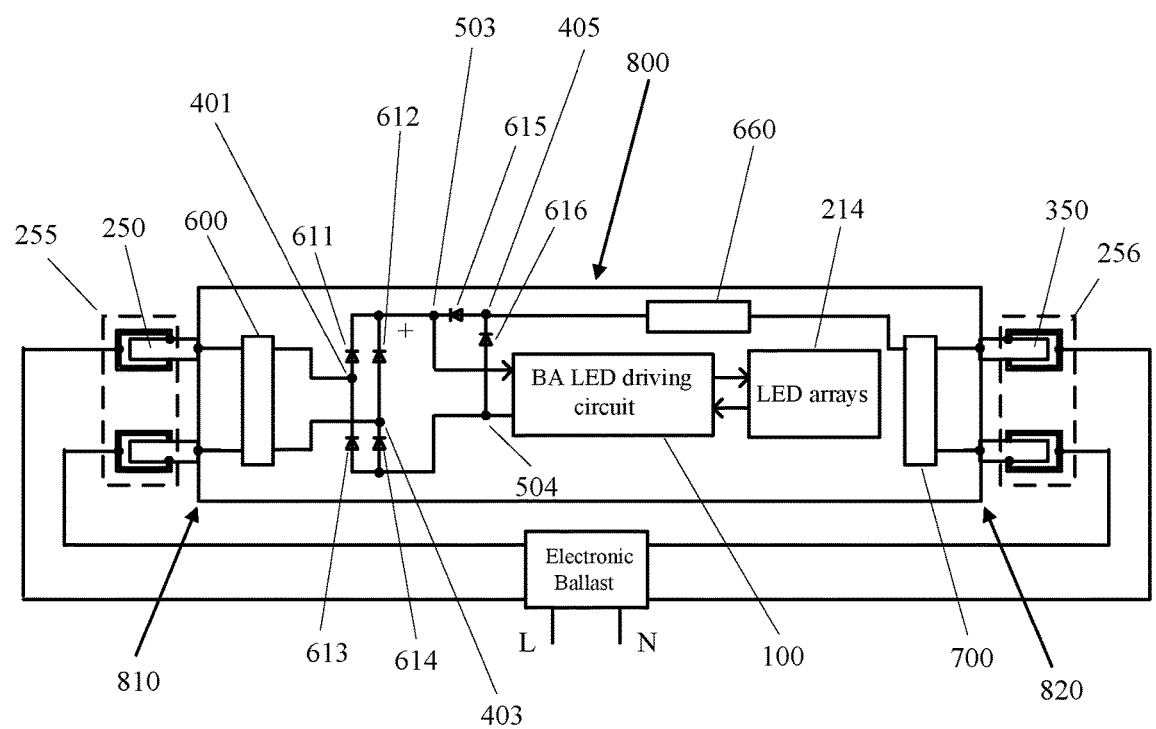
FIG. 2 is a block diagram of a linear LED tube lamp operable with an electronic ballast in double ends according to the present disclosure.

FIG. 2 is a block diagram of a linear LED tube lamp operable with a rapid-start electronic ballast in double ends according to the present disclosure. As shown, the LLT lamp 800 is connected to the rapid-start electronic ballast which has two pairs of wires connecting to a fluorescent fixture through the two bi-pins 250 and 350 in the double-ended configuration. After a successful initial startup by the ballast to test the filament circuits in the front-end modules 600 and the rear-end module 700, a high output AC voltage appears across the bi-pins 250 and 350, no matter which pin is energized. Suppose that in a positive half-cycle the bi-pin 250 has a high electric potential relative to the bi-pin 350, the high electric potential appears at either the port 401 or the port 403 via the front-end module 600. Whereas a high DC potential appears at the port 503 relative to a low electric potential at the port 504, a DC current flows into the BA LED driving circuit 100. When the BA LED driving circuit 100 is powered up, a proper LED diving voltage is built up to power the LED arrays 214. An electric current return at the port 504 is blocked by the diodes 613 and 614 preventing it from flowing back to the bi-pin 250 because of a reverse bias. Instead, the electric current is guided to go through the diode 616 in the two rear-end diodes, via the at least one frequency sensitive device 660. As mentioned, the at least one frequency sensitive device 660 has the low impedance at the high frequency for the electronic ballast. Thus the electric current can find its way out via the filament circuit in the rear-end module 700 to the bi-pin 350, completing a positive half-cycle power delivery to the LED arrays 214. Similarly, in a negative half-cycle, the bi-pin 350 has a high electric potential. An electric current flows from the filament circuit in the rear-end module 700 and the at least one frequency sensitive device 660 to the port 405, continuing to pass through the diode 615 in the two rear-end diodes 615 and 616. The electric current cannot pass through the four front-end diodes 611-614 because the diodes 611 and 612 block its way due to a reverse bias. Whereas a high DC potential appears at the port 503 relative to a low electric potential at the port 504, a DC current flows into the BA LED driving circuit 100. When the BA LED driving circuit 100 is powered up, a proper LED diving voltage is built up to power the LED arrays 214. An electric current return at the port 504 is blocked by the diode 616, preventing it from flowing back to the bi-pin 350 because of a reverse bias. Instead, the electric current is guided to go through the diode 613 and the diode 614 in the four front-end diodes 611-614, passing through the front-end module 600, to reach the bi-pin 250, completing a negative half-cycle power delivery to the LED arrays 214.

Although a rapid-start electronic ballast is used in FIG. 2 as an example to show that the LLT lamp proposed can operate with electronic ballast in a double-ended configuration, the LLT lamp can also work in an instant-start electronic ballast. In general, when operating with instant-start electronic ballast, the bi-pins 250 and 350 are respectively inserted into two shunted sockets 255 and 256. Because two pins of each of the bi-pins 250 and 350 are electrically shorted in the two shunted sockets 255 and 256, the filament circuits in the front-end module 600 and the rear-end module 700 have no effect but provide electrical interfaces between the LLT lamp and the electronic ballast. Other functionalities are the same as those for LLT lamp operable with the rapid-start electronic ballast. In fact, when the instant-start electronic ballast is used with the LLT lamp, the filament circuits in the front-end module 600 and the rear-end module 700 are not required to operate the LLT lamp. The configuration of the filament circuits work well for both rapid-start and instant-start electronic ballasts.

In FIGS. 1 and 2, the at least six diodes 611-616 and the LED driving circuit 100 may be separately mounted near the two opposite ends of the LLT lamp. In this case, electrical connections between the at least six diodes 611-616 and the LED driving circuit 100 and between the at least six diodes 611-616 and the at least one frequency sensitive device 660 are needed to make proper current flows and current returns to operate the LED driving circuit 100 to power the LED arrays 214. One possible approach is via copper traces on the LED PCB instead of using long electrical wires. At least three such copper traces on the LED PCB, extended between the two opposite ends of the LLT lamp, are needed for single-ended AC mains and double-ended ballast operations.

Figure 3:
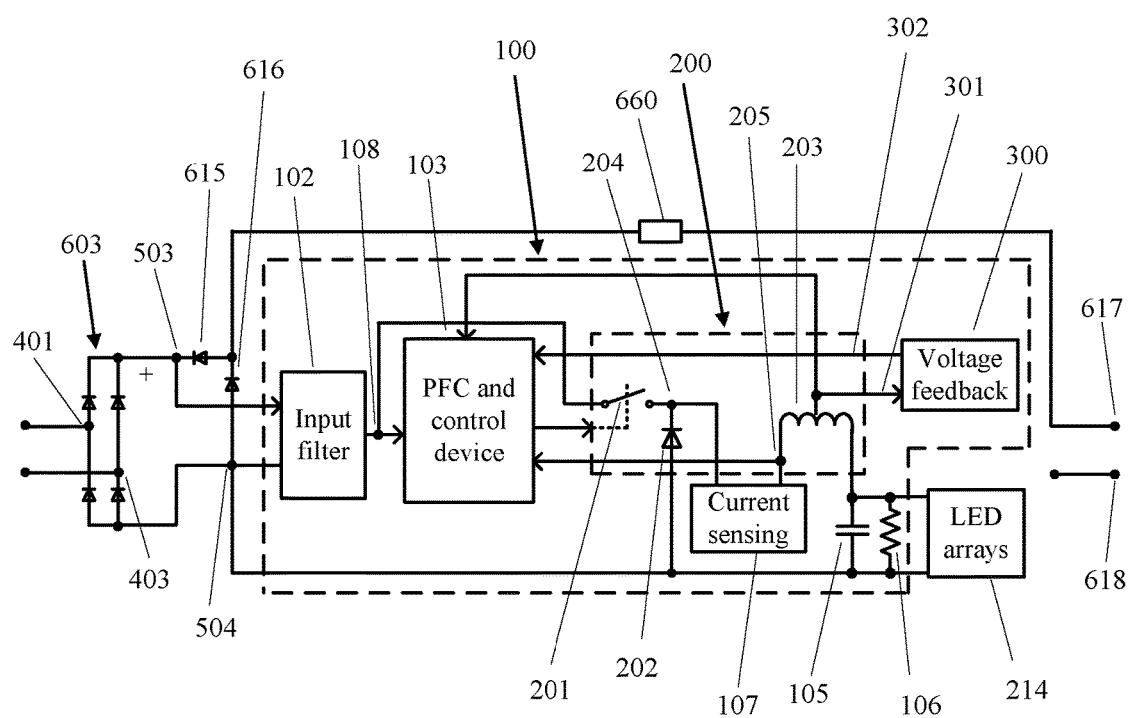
FIG. 3 is a block diagram of a BA LED driving circuit used in a linear LED tube lamp operable with either AC mains in a single end or a ballast in double ends according to the present disclosure.

FIG. 3 is a block diagram of a BA LED driving circuit used in a linear LED tube lamp operable with either AC mains in a single end or a ballast in double ends according to the present disclosure. In FIG. 3, the BA driving circuit 100 connects to the ports 503 and 504 interconnected between the four front-end diodes 603 and the two rear-end diodes 615 and 616 with the AC mains applied to the ports 401 and 403. When a voltage applies to the both ends of the LLT lamp for an electronic ballast application, an electrical connection between the ports 401 and 403 in the front end and ports 617 and 618 in the rear end of the LLT lamp must be made to receive energy from both ends. The two rear-end diodes 615 and 616 thus need to connect to the at least one frequency sensitive device 660 to reach the ports 617 and 618 in the rear end. The BA driving circuit 100 comprises an input filter 102 used to filter an input voltage from the ports 503 and 504 and to suppress EMI noise created in the BA driving circuit 100, a power factor correction (PFC) and control device 103, a Buck converter 200 in communicating with the PFC and control device 103, an output capacitor 105 in parallel with a resistor 106 connected to the Buck converter 200 to build up an output voltage and to power the LED arrays 214, a current sensing resistor 107, and a voltage feedback module 300 extracting partial energy from the output voltage to sustain the PFC and control device 103. A high electric potential at the port 503 and a low electric potential at the port 504 respectively connect to the high side and the low side of the input filter 102 with the low electric potential port 504 as a common ground. The Buck converter 200 comprises a switch 201 controlled by the PFC and control device 103, a diode 202, and an inductor 203 with its current charging and discharging controlled by the switch 201. The PFC and control device 103 detects zero current in the inductor 203 within an AC cycle of an input voltage and generate control signals to control the switch 201 on and off with a constant on-time and a varied off-time. By adapting switching frequencies for a high frequency associated with a ballast and a low frequency associated with the AC mains, the PFC and control device 103 controls the switch 201 on and off in a way that the inductor 203 is charged during on-time and discharged during off-time until a desired output voltage $V_o$ across the LED arrays 214 is reached to light up the LED arrays 214. An average inductor current is thus equal to the output current that flows into the LED array 214. When the switch 201 is on, the diode 202 is reverse-biased, and an input current flows from an output port 108 in the input filter 102, the switch 201, the first port 204 of the current sensing resistor 107, the current sensing resistor 107 itself, and the second port 205 of the current sensing resistor 107, into the inductor 203. When the current flowing into the inductor 203 increases, the voltage across the current sensing resistor 107 increases. The PFC and control device 103 connecting to the second port 205 of the current sensing resistor 107 continuously receives signals and adjusts the off-time such that the output voltage and current to the LED arrays 214 are regulated to meet the output requirements. The output capacitor 105 in parallel with the resistor 106 connecting to the inductor 203 thus can receive energy to build up an output voltage and to power the LED arrays 214.

In FIG. 3, the inductor 203 is configured as an autotransformer. The voltage feedback module 300 comprising a diode has two connection ports 301 and 302, with the first connection port 301 connecting to the center-tapped port of the autotransformer type inductor 203 and with the second connection port 302 connecting to the PFC and control device 103. The PFC and control device 103 has an input capacitor (not shown) used to store energy with a supplying voltage built up to supply an internal logic control circuit (not shown) in the PFC and control device 103. When the supplying voltage decreases due to its increased internal operations and controls, and when the voltage at the center-tapped port of the inductor 203 is higher than the supplying voltage, the diode in the voltage feedback module 300 conducts to supply a current to the input capacitor in the PFC and control device 103 and to sustain its operations. The function of the voltage feedback module 300 is essential because the BA LED driving circuit 100 has a wide range of operating voltages not only 110 and 277 VAC for the AC mains but also 375~400 VAC for the electronic ballast. In the PFC and control device 103, a start-up resistor (not shown) is so designed to operate the LED tube lamp at the lowest input voltage 110 VAC. When the highest voltage 400 VAC from the electronic ballast comes in, a higher proportional voltage appears at an input of the internal logic control circuit. Therefore an operating voltage for the internal logic control circuit in the PFC and control device 103 should be in a wide range such as 11~35 volts, DC rather than 5~15 volts, DC as in a conventional logic control device. To meet requirements of start-up time and current without turn-on failure or flickering occurred at the lamp start-up, the input capacitor in the PFC and control device 103 with a minimum capacitance is designed and used at the input of the internal logic control circuit. The voltage feedback module 300 is thus needed to pump in energy in time and to sustain the operating voltage ensuring no flickering occurred when operating the LLT lamp.

When the switch 201 is off, the diode 202 is forward-biased, and the inductor 203 discharges with a loop current flowing from the LED arrays 214, the diode 202, the current sensing resistor 107, back to the inductor 203. The current sensing resistor 107 keeps track of the output current and feedbacks to the PFC and control device 103 to further control the switch 201 on and off. The closed loop operation in both on-time and off-time of the switch 201 ensures the output current to be accurately controlled within 4%.

Figure 4:
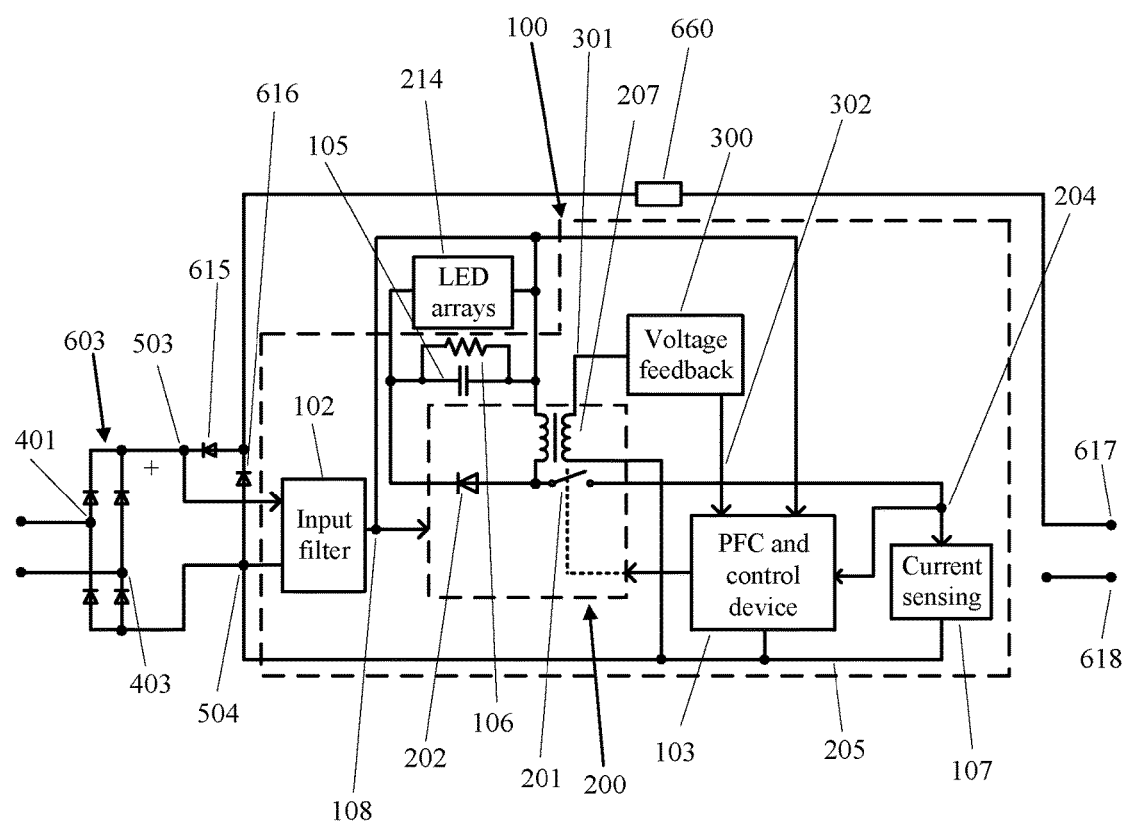
FIG. 4 is a block diagram of another embodiment of a BA LED driving circuit used in a linear LED tube lamp operable with either AC mains in a single end or a ballast in double ends according to the present disclosure.

FIG. 4 is a block diagram of another embodiment of a BA LED driving circuit used in a linear LED tube lamp operable with either AC mains in a single end or an electronic ballast in double ends according to the present disclosure. FIG. 4 has all the components as in FIG. 3, except that interconnections are different, and a transformer 207 in FIG. 4 replaces the center-tapped inductor 203 in FIG. 3. In FIG. 4, the same numerals are used for the same components as in FIG. 3. In FIG. 4, when the power is on, an input current enters the input filter 102 and then the PFC and control device 103, turning on the switch 201. Whereas the diode 202 is reverse-biased, the input current goes from the resistor 106, a primary side of the transformer 207, the switch 201, and the current sensing resistor 107 to the common ground 504, completing an AC cycle. When the input current goes into the primary side of the transformer 207, energy is stored in it. The PFC and control device 103 detects the input voltage level and controls the switch 201 on and off in a way that a desired output voltage $V_o$ across the LED arrays 214 is reached to light up the LED arrays 214. When the switch 201 is off, the diode 202 is forward-biased, and the primary side of the transformer 207 releases the energy stored, resulting in a loop current flowing from the diode 202 and the LED arrays 214, back to the primary side of the transformer 207, completing the energy transfer to the LED arrays 214. When the switch 201 is on, the input current flows into the LED arrays 214, the primary side of the transformer 207, the switch 201, and the current sensing resistor 107, creating a voltage drop across the current sensing resistor 107. The voltage appearing at the port 204 of the current sensing resistor 107 inputs to the PFC and control device 103 to control the off-time of the switch 201. The voltage feedback module 300 has two connection ports 301 and 302, with the first connection port 301 connecting to a high side of a secondary winding in the transformer 207 and with the second connection port 302 connecting to the PFC and control device 103, as in FIG. 3. The voltage feedback module 300 continuously monitors the output voltage by using the secondary winding in the transformer 207. When the voltage at the high side of the secondary winding is higher than a becoming lower operating voltage in the PFC and control device 103 due to increased internal operations, the diode (not shown) in the voltage feedback module 300 conducts to supply energy in time through the second connection port 302 and to sustain the operating voltage in the PFC and control device 103.

Figure 5:
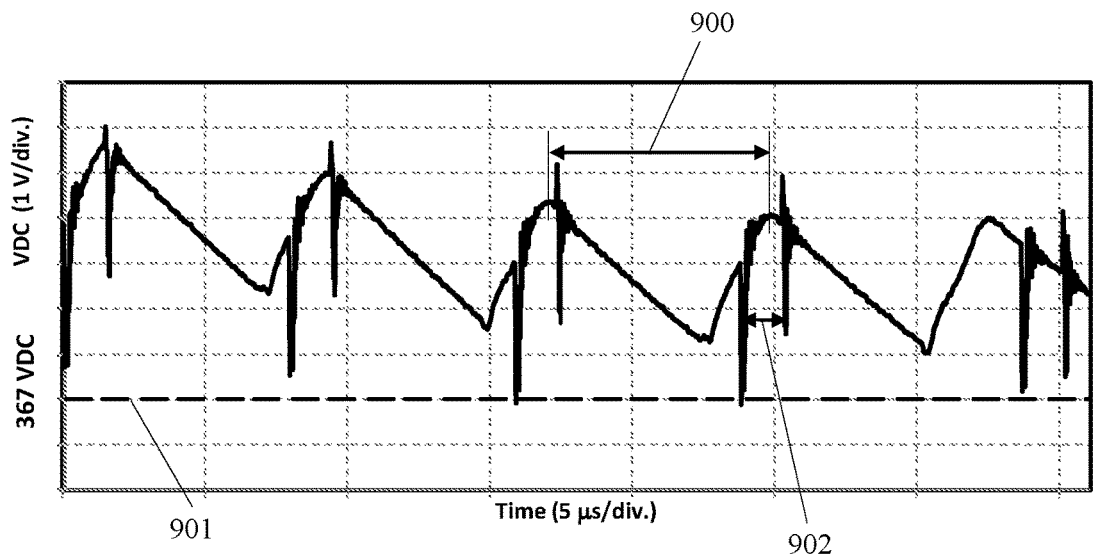
FIG. 5 is a waveform of DC voltage measured at input of a BA LED driving circuit used in a linear LED tube lamp powered by an electronic ballast according to the present disclosure.

FIG. 5 is a waveform of DC voltage measured at input of the BA LED driving circuit used in a linear LED tube lamp powered by an electronic ballast according to the embodiment in FIG. 2. When the electronic ballast connects to the LLT lamp with power, it supplies a high voltage over 350 VAC and a frequency in a range of 40~64 kHz, depending on ballast designs. Referring to FIGS. 3 and 4, the at least six diodes 611-616 are used to convert AC into DC to power the BA LED driving circuit 100. The at least six diodes 611-616 connects to the input filter 102 used to filter out the input voltage and suppress EMI voltage generated in power switching in the BA LED driving circuit 100. In FIG. 5, the DC voltage is 370 V (rms) relative to a 367 VDC level at 901 with a ripple cycle 900 repeated every 7.8 µs showing a frequency of 128 kHz, twice the output frequency of the electronic ballast used. The glitches in the waveform show the EMI noise when the switch 201 is turned on and off with an on-time 903 of 1.5 µs, adapted in the PFC and control device 103. Such a short on-time is so chosen by the PFC and control device 103 because the ballast output voltage is high, and the energy the inductor is charged within the on-time is sufficiently enough to power the LED arrays 214 in each AC cycle.

Figure 6:
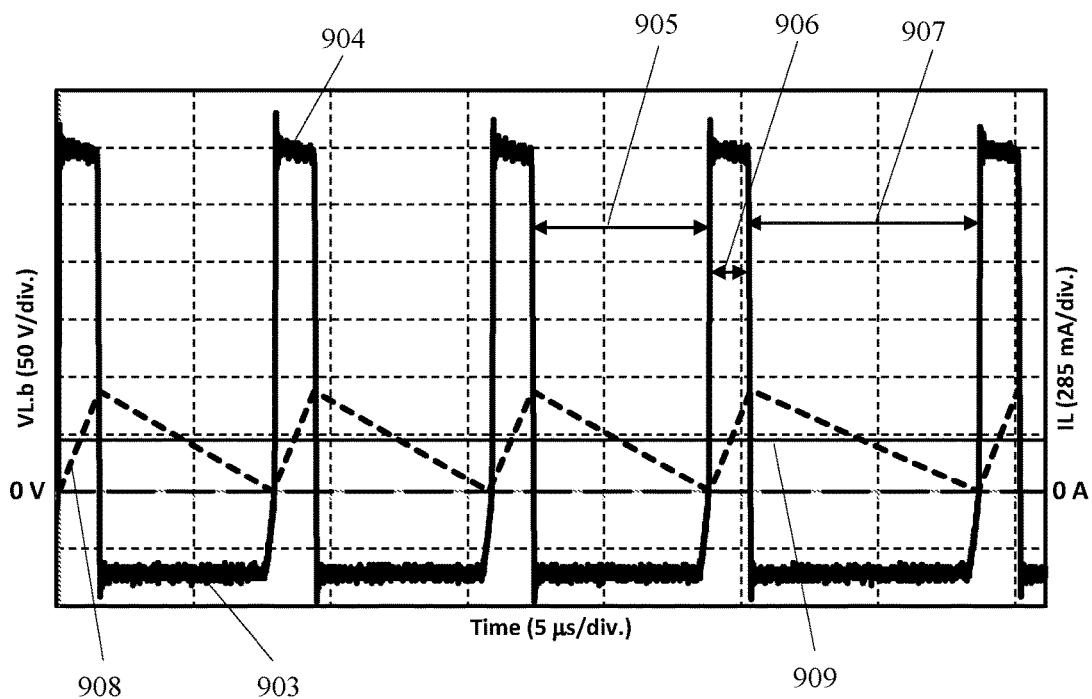
FIG. 6 is a waveform of a voltage measured across an inductor used in a BA LED driving circuit when an electronic ballast is used to operate a linear LED tube lamp according to the present disclosure.

FIG. 6 is a waveform of a voltage measured across an inductor used in a BA LED driving circuit when an electronic ballast is used to operate a linear LED tube lamp according to the present disclosure. Referring to FIGS. 3 and 6, the inductor 203 is charged when the switch 201 is on. The high level at 904 represents $V_{DC,b} - V_o$, where $V_{DC,b}$ is a voltage output from the switch 201 when the BA LED driving circuit 100 is powered by the electronic ballast, and $V_o$ is a desired output voltage across the LED arrays 214. The $V_{DC,b}$ is over 370 V (rms). The low level at 903 represents $-V_o$. The voltage $V_{L,b}$ across the inductor 203 shows a series of pulses with a pulse width 906 of 1.5 µs, representing the on-time of the switch 201. The inductor 203 is discharged when the switch 201 is off. As seen in FIG. 6, an inductor current 908 increases linearly with the on-time from the zero current, reaching the maximum $I_{pk}$ at the end of the on-time, then starting to discharge from the maximum inductor current $I_{pk}$ during off-time. At the end of each discharging cycle, the inductor current decreases to zero, and the PFC and control device 103 detects the zero current and turns on the switch 201 for a next charging cycle. An average inductor current 909 thus represents a desired output current to operate the LED arrays 241. For a $V_{DC,b}$ of 370 V rectified from an electronic ballast to going into the BA LED driving circuit 100, the on-time is fixed at 1.5 µs, whereas the off-time of the switch 201 varies as determined by the zero inductor current. In FIG. 6, two off-time periods 905 and 907, respectively representing 6.34 µs and 8.41 µs appear in the series of pulses. Thus the corresponding switching frequencies are 128 kHz and 101 kHz. This means that only one inductor charging cycle is available for each half cycle of the ballast AC input. The switching frequency of 128 kHz dominates in most cycles, which gives an output voltage $V_o$ based on a duty cycle of 0.191 with a constant output current $I_o$. Because the LED arrays 214 can clamp the output voltage to a stacked forward voltage determined by a plurality of LEDs connected in series, a constant (regulated) current gives a regulated power to operate the LED arrays 214 when the electronic ballast is used with the BA LED driving circuit 100.

Figure 7:
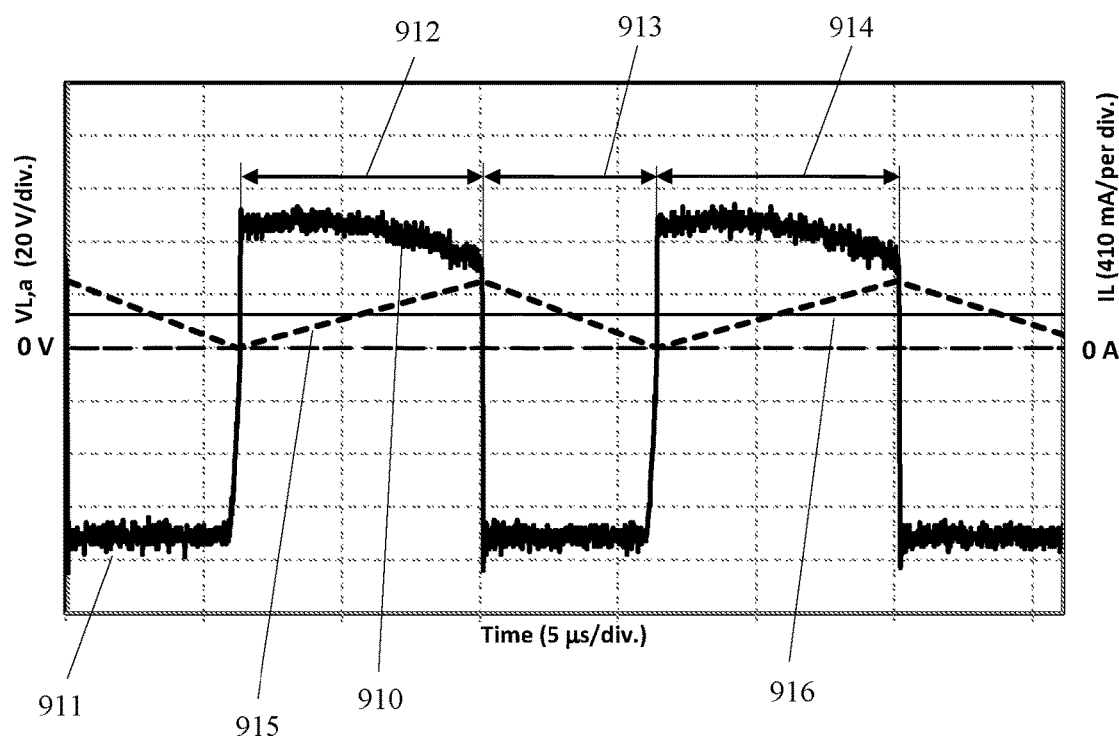
FIG. 7 is a waveform of a voltage measured across an inductor used in a BA LED driving circuit when a power from AC mains is used to operate a linear LED tube lamp according to the present disclosure.

Referring to FIG. 1, when 120 V/60 Hz of the AC mains is applied to the LLT lamp, the four front-end diodes 611-614 outputs a DC voltage of 158 V (pk) with a ripple cycle of 8.33 ms equivalent to a frequency of 120 Hz, twice the frequency of the AC mains. FIG. 7 is a waveform of a voltage measured across an inductor used in a BA LED driving circuit 100 when a power from 120 V of AC mains is used to operate a linear LED tube amp according to the present disclosure. Referring to FIGS. 3 and 7, the inductor 203 is charged when the switch 201 is on. The high level at 910 represents $V_{DC,a} - V_o$, where $V_{DC,a}$ is a voltage output from the switch 201 when the BA LED driving circuit 100 is powered by 120 V AC mains, and $V_o$ is a desired voltage across the LED arrays 214. The low level 911 represents $-V_o$. In FIG. 7, the voltage $V_{L,a}$ function of time across the inductor 203 shows two pulses with both of their pulse widths 912 and 914 of 8.66 µs, representing the on-time of the switch 201 under 120 V AC mains input. The inductor 203 is discharged when the switch 201 is off. As shown in FIG. 7, an inductor current 915 increases linearly with the on-time from the zero current when charged, reaching the maximum $I_{pk}$ at the end of the on-time, then starting to discharge from the maximum inductor current $I_{pk}$ during off-time. At the end of each discharge cycle, the inductor current decreases to zero, and the PFC and control device 103 detects the zero current and turns on the switch 201 for a next charging cycle. An average inductor current 916 thus represents a desired output current to operate the LED arrays 241. For a $V_{DC}$ of 158 V rectified from the 120 V AC mains to going into the BA LED driving circuit 100, the on-time is fixed at 8.66 µs, whereas the off-time of the switch 201 varies as determined by the zero inductor current. In FIG. 7, the off-time period 913 of 6.22 µs appears in between the two pulses. Thus the corresponding switching frequency is 67 kHz. This means that hundreds of inductor charging cycles are used for each half cycle of the 120 V AC mains input. However, the switching frequencies vary from 55 kHz to 67 kHz for each half cycle of the 120 V AC mains input because $V_{DC,a}$ has a sinusoidal dependency, and the off-time varies accordingly. In FIG. 7, a duty cycle of 0.582 gives a desired output voltage $V_o$ with a constant output current, yielding a regulated power to operate the LED arrays 214 when the AC mains are used with the BA LED driving circuit 100. For a 277 VAC/60 Hz input, experimental results are similar to the ones depicted above for 110 VAC input with a switch on-time and off-time of 2 µs and 8~9.5 µs, respectively, which is equivalent to a switching frequency of 90~103 kHz.

Although the above embodiments use a linear LED tube lamp as an example, in fact, all the conventional fluorescent lamps used today can be replaced with the LED tube lamps adopting the BA LED driving circuit, featuring as ballast compatible and AC mains operable.

Whereas preferred embodiments of the present disclosure have been shown and described, it will be realized that alterations, modifications, and improvements may be made thereto without departing from the scope of the following claims. Another BA LED driving circuit with a voltage feedback module or another electric current flow management in a linear LED tube lamp using various kinds of combinations to accomplish the same or different objectives could be easily adapted for use from the present disclosure. Accordingly, the foregoing descriptions and attached drawings are by way of example only, and are not intended to be limiting.

What is claimed is:

1. A linear light-emitting diode (LED) tube lamp, comprising:
    a housing having two opposite ends;
    a light-emitting diode printed circuit board (LED PCB) extended between the two opposite ends of the housing, the LED PCB comprising LED arrays and copper traces disposed thereon;
    two lamp bases respectively connected to the two opposite ends of the housing, each lamp base comprising a respective bi-pin each with two pins protruding outwards;
    at least six diodes comprising four front-end diodes and two rear-end diodes, the at least six diodes configured to manage electric current flows and convert an alternating current (AC) input voltage into a direct current (DC) input voltage;
    at least one frequency sensitive device connected to the two rear-end diodes; and
    an LED driving circuit configured to receive the DC input voltage from the at least six diodes, the LED driving circuit comprising an input filter, a power factor correction (PFC) and control device, a switch controlled by the PFC and control device, a current sensing resistor, a diode, an inductor with its current charging and discharging controlled by the switch, a resistor, an output capacitor in parallel with the resistor connected to the inductor to build up an output voltage and to power the LED arrays, and a voltage feedback module configured to draw partial power from the output voltage to sustain an operation of the PFC and control device;
    wherein, responsive to detecting zero current in the inductor and the DC input voltage within each AC cycle of the AC input voltage, the PFC and control device generates control signals to control the switch on and off with a constant on-time and a varied off-time;
    wherein, when AC mains are used to power the linear LED tube lamp, an AC voltage from the AC mains is applied to one of the bi-pins electrically coupled to the four front-end diodes; and
    wherein, when an electronic ballast is used to power the linear LED tube lamp, an AC voltage from the electronic ballast is applied across the two bi-pins in the two opposite ends.

2. The linear LED tube lamp of claim 1, wherein the at least one frequency sensitive device is configured to couple the AC voltage from the electronic ballast and decouple the AC voltage from the AC mains.

3. The linear LED tube lamp of claim 1, wherein the at least one frequency sensitive device comprises a capacitor.

4. The linear LED tube lamp of claim 1, wherein the two lamp bases further respectively comprise a front-end module and a rear-end module.

5. The linear LED tube lamp of claim 4, wherein each of the front-end module and the rear-end module comprises a resistor and a capacitor in parallel with the resistor.

6. The linear LED tube lamp of claim 5, wherein an impedance of the capacitor in parallel with the resistor has a first impedance value at 60 Hz and a second impedance value at 45 kHz with a ratio between the first impedance value and the second impedance value greater than 13, and wherein the first impedance value is greater than the second impedance value.

7. The linear LED tube lamp of claim 1, wherein the voltage feedback module comprises a diode.

8. The linear LED tube lamp of claim 1, wherein the switch in the LED driving circuit operates at a switching frequency no less than 55 kHz.

9. The linear LED tube lamp of claim 1, wherein the inductor in the LED driving circuit is of an autotransformer type.

10. The linear LED tube lamp of claim 1, wherein the inductor in the LED driving circuit is of a transformer type.

11. The linear LED tube lamp of claim 1, wherein the PFC and control device operates in a range approximately between 11 V and 35 VDC.

12. The linear LED tube lamp of claim 1, wherein the at least six diodes and the LED driving circuit are separately mounted near the two opposite ends of the linear LED tube lamp.

13. The linear LED tube lamp of claim 12, wherein electrical connections between the at least six diodes and the LED driving circuit and between the at least six diodes and the at least one frequency sensitive device are made by using at least three copper traces on the LED PCB extending between the two opposite ends.

* * * * *